United States Patent
Coleman et al.

(10) Patent No.: US 8,232,693 B2
(45) Date of Patent: Jul. 31, 2012

(54) RESOLVER WITH LOCATING FEATURE

(75) Inventors: Kevin P Coleman, Livonia, MI (US); Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 395 days.

(21) Appl. No.: 12/685,283

(22) Filed: Jan. 11, 2010

(65) Prior Publication Data

US 2011/0169382 A1 Jul. 14, 2011

(51) Int. Cl.
*H02K 24/00* (2006.01)
*G01D 5/00* (2006.01)

(52) U.S. Cl. ............ 310/68 B; 310/216.114; 310/254.1; 310/260; 324/207.25

(58) Field of Classification Search ................ 310/68 B, 310/91, 216.114, 254.1, 260; 324/207.25
See application file for complete search history.

(56) References Cited

U.S. PATENT DOCUMENTS

| | | | |
|---|---|---|---|
| 5,691,588 A * | 11/1997 | Lutz et al. ........................ | 310/92 |
| 6,492,742 B1 * | 12/2002 | Fujikawa et al. ............ | 290/40 C |
| 6,756,709 B2 | 6/2004 | Kobayashi et al. | |
| 7,347,963 B2 | 3/2008 | Namiki et al. | |
| 7,595,572 B2 * | 9/2009 | Haga et al. ....................... | 310/71 |
| 7,830,051 B2 * | 11/2010 | Kataoka et al. .................. | 310/71 |
| 2005/0206253 A1 | 9/2005 | Hertz et al. | |
| 2009/0179632 A1 * | 7/2009 | Nishiguchi et al. ...... | 324/207.25 |
| 2010/0117632 A1 * | 5/2010 | Miyazaki et al. ......... | 324/207.25 |
| 2010/0156401 A1 * | 6/2010 | Nishiguchi et al. ...... | 324/207.25 |
| 2010/0219816 A1 * | 9/2010 | Urano et al. ............. | 324/207.25 |

* cited by examiner

*Primary Examiner* — Tran Nguyen
(74) *Attorney, Agent, or Firm* — Quinn Law Group, PLLC

(57) ABSTRACT

A resolver is configured to determine the rotational position of a first member that is selectively rotatable about an axis with respect to a second member. The resolver includes a stator core, a plurality of wire windings operatively connected to the stator core, a winding support between the windings and the stator core, and a cover at least partially enclosing the windings. One of the cover and the winding support defines a pin that is fittable inside a hole in the second member. The pin functions as a locating feature, which ensures that the stator is accurately mounted to the second member. Because the pin is part of the winding support or the cover, the locating feature does not entail the use of an extra part, thereby simplifying assembly of the stator.

18 Claims, 5 Drawing Sheets

RESOLVER WITH LOCATING FEATURE

TECHNICAL FIELD

This invention relates to electric motor position sensors.

BACKGROUND OF THE INVENTION

A resolver includes a stator and a rotor. The rotor is selectively rotatable with respect to the stator about an axis. The resolver is configured to generate a signal that is indicative of the rotary position, speed, and direction of the rotor with respect to the stator. Accordingly, a resolver may be used as a sensor to monitor the rotary position, speed, and direction of a rotating member with respect to a stationary member. For example, a resolver may be used to monitor the rotary position, speed, and direction of the rotor of an electric motor.

More specifically, to monitor the rotary position of the rotating member with respect to the stationary member, the stator is mounted with respect to the stationary member and the rotor is mounted to the rotating member for unitary rotation therewith. To accurately measure the rotary position of the rotating member with respect to the stationary member, the stator of the resolver must be affixed with respect to the stationary member at a predetermined angular position.

SUMMARY OF THE INVENTION

A resolver is configured to determine the rotational position of a first member that is selectively rotatable about an axis with respect to a second member. The resolver includes a stator core, a plurality of wire windings operatively connected to the stator core, a winding support between the windings and the stator core, and a cover at least partially enclosing the windings. One of the cover and the winding support defines a pin that is fittable inside a hole in the second member.

The pin functions as a locating feature, which ensures that the stator is properly positioned with respect to the second member. Because the pin is part of the winding support or the cover, the locating feature does not entail the use of an extra part, thereby simplifying assembly of the stator.

Furthermore, placement of the pin on the winding support or the cover enables attachment slots formed in the stator core to be identical to one another, thereby simplifying the laminations that form the stator core. This simplification of the laminations enables rotation of the laminations during the manufacturing process, which results in improved accuracy of the resolver.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
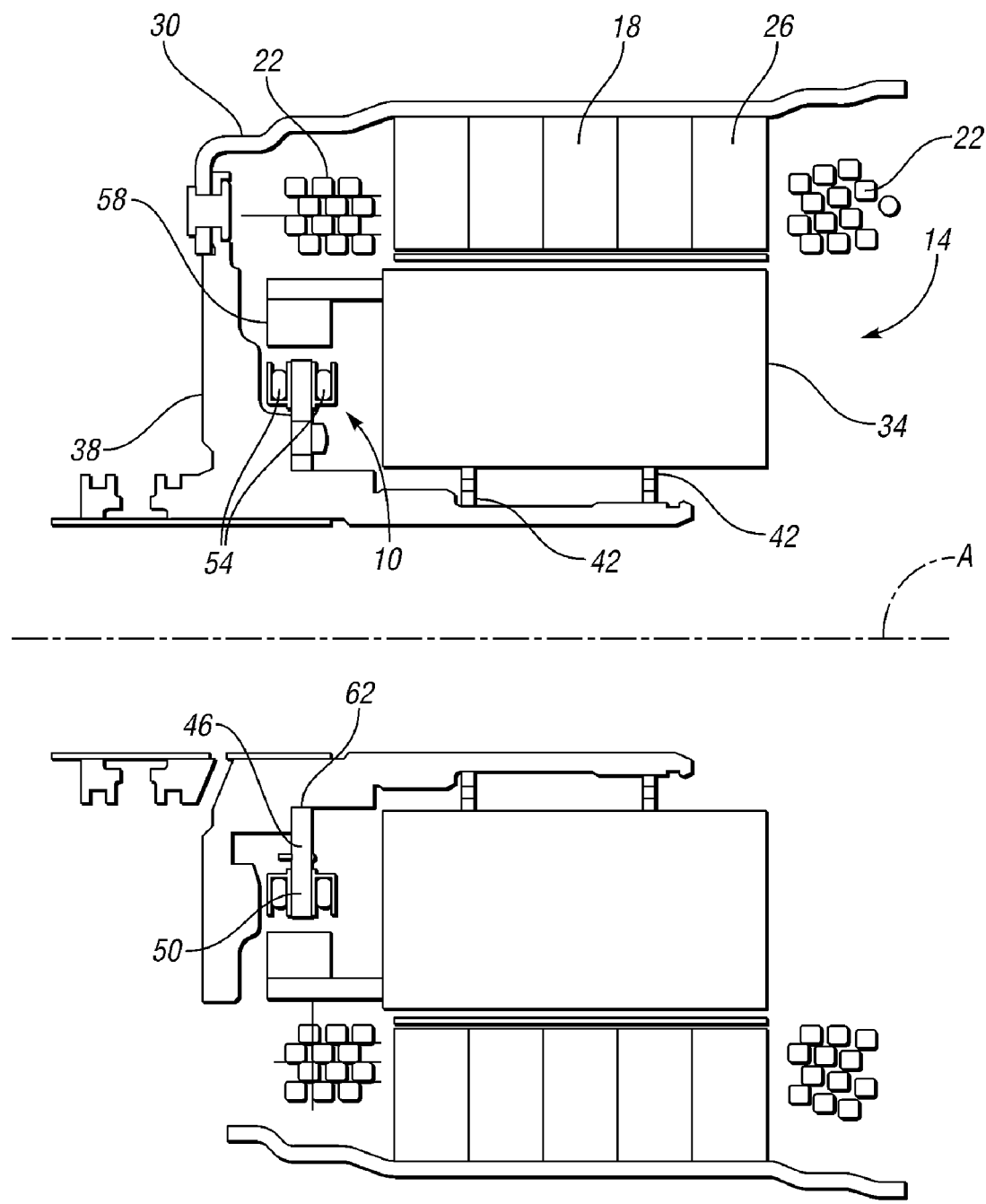
FIG. 1 is a schematic, cross-sectional view of a motor assembly including an electric motor and a resolver.

Referring to FIG. 1, a resolver 10 is operatively connected to an electric motor 14. The motor 14 includes a stationary member, i.e., stator 18. The stator 18 includes wire windings 22 operatively connected to a stator core 26. The stator 18 is rigidly mounted to a motor housing 30. The motor 14 also includes a selectively rotatable member, i.e., rotor 34. The rotor 34 is rotatably mounted to a rotor support 38 by a plurality of roller bearings 42 for rotation about axis A. The rotor support 38 is rigidly mounted to the housing 30, and thus the rotor 34 is selectively rotatable with respect to the housing 30, rotor support 38, and stator 18 about axis A in response to selective charging of the windings 22, as understood by those skilled in the art.

The resolver 10 includes a stator 46 having a stator core 50 with windings, or coils 54, operatively connected thereto. The stator core 50 is rigidly mounted to the rotor support 38, and is thus stationary relative to the motor stator 18. The resolver 10 also includes a rotor 58 that is mounted with respect to the rotor 34 of the motor 14 for unitary rotation therewith about axis A. In the embodiment depicted, the rotor 58 is annular and concentrically surrounds the stator 46. Alternatively, and within the scope of the claimed invention, the stator 46 may concentrically surround the rotor 58. The stator core 50 is annular, and defines a cylindrical inner surface 62 that contacts rotor support 38.

As understood by those skilled in the art, the resolver 10 operates by sensing the relative motion of the rotor 58 turning outside the stator 46 with the coils 54. The coils 54 receive an excitation signal from a controller (not shown), and two pickup coils (not shown, but preferably located in a like radial position on the resolver stator 46 as the stator coils 54) return the signal to the controller with voltage levels dependent on the proximity and speed of the lobes (not shown) of the rotor 58.

Referring to FIGS. 2-5, wherein like reference numbers refer to like components from FIG. 1, the stator core 50 defines a plurality of elongated attachment slots, i.e., apertures 66, for attachment of the stator core 50 to the rotor support 38. The apertures 66 are evenly spaced about a circle having its centerpoint on axis A. Each aperture 66 has the general shape of an arc of a circle having its centerpoint on axis A. Each aperture 66 has substantially the same size and shape.

Figure 2:
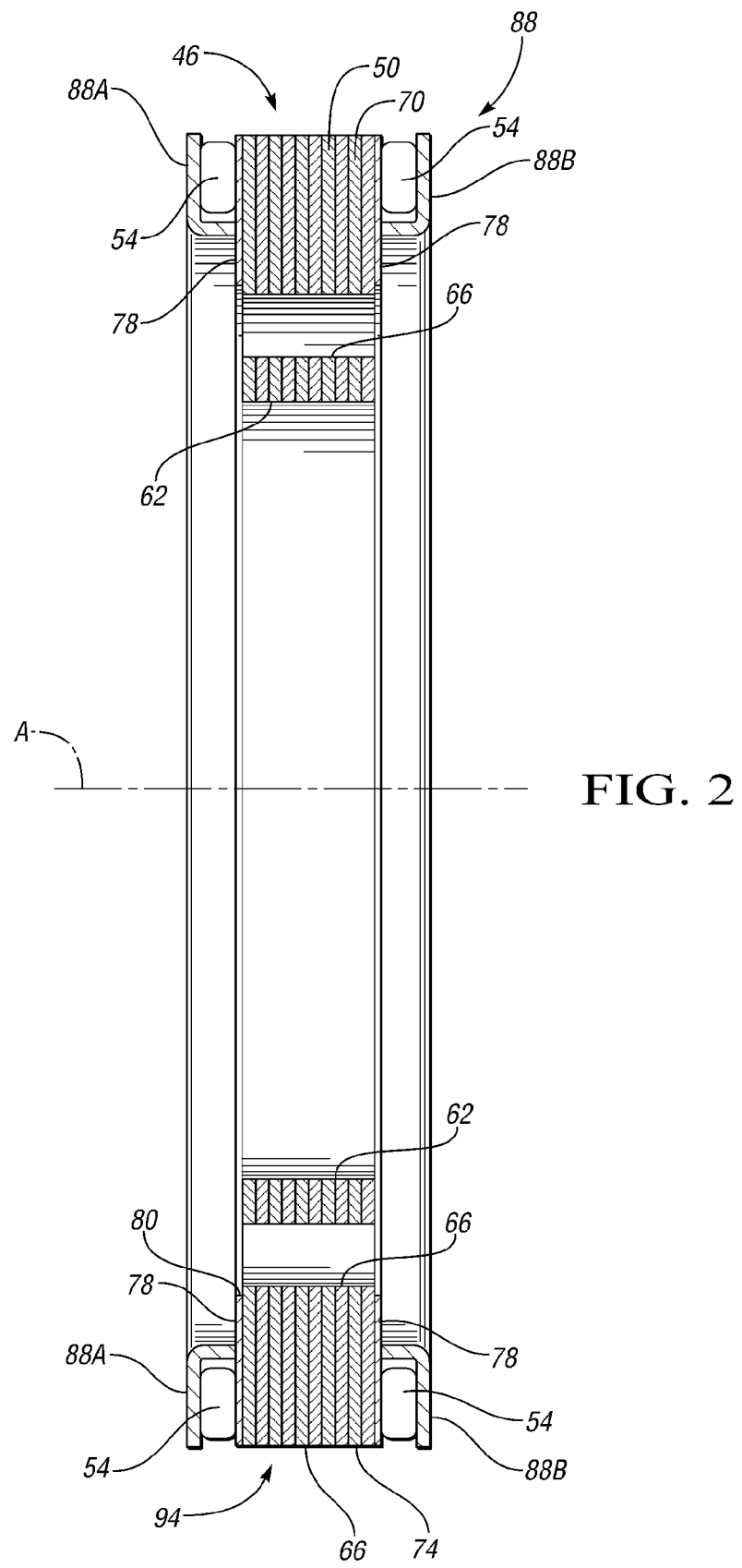
FIG. 2 is a schematic, cross-sectional view of the resolver of FIG. 1.
Figure 3:
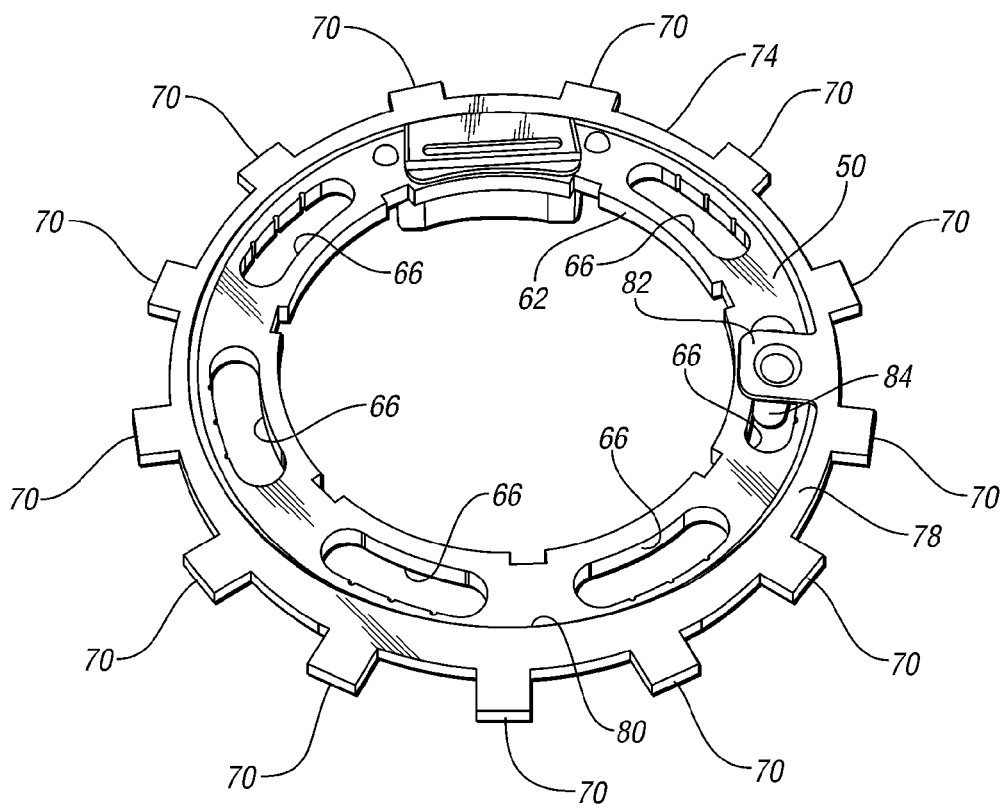
FIG. 3 is a schematic, perspective view of the resolver of FIG. 1 without a cover.

A plurality of teeth 70 are formed in the outer surface 74 of the stator core 50. The teeth 70 are evenly spaced and project radially outward. The coils 54 are wound around the teeth 70, as shown in FIG. 2, and as understood by those skilled in the art. The stator 46 includes a winding support 78 that is mounted to the stator core 50 and that surrounds the teeth 70. The winding support 78 is thus disposed between the coils 54 and the teeth 70 of the core 50, and functions to protect the coils 54 from the metal core 50. In the embodiment depicted, the winding support 78 comprises a polymeric material, such as an epoxy resin.

The winding support 78 includes a generally annular inner surface 80. The winding support 78 includes a portion 82 that projects radially inward from surface 80. Portion 82 extends across one of the apertures 66. The winding support 78 further includes a pin 84 that projects axially from portion 82 such that the pin 84 extends through the aperture 66 that portion 82 extends across. In the embodiment depicted, the pin 84 is cylindrical, although other pin shapes may be employed within the scope of the claimed invention. In the embodiment depicted, the entire winding support 78, including portion 82 and pin 84, is formed by a single piece of material, i.e., the winding support 78 is one-piece.

Figure 4:
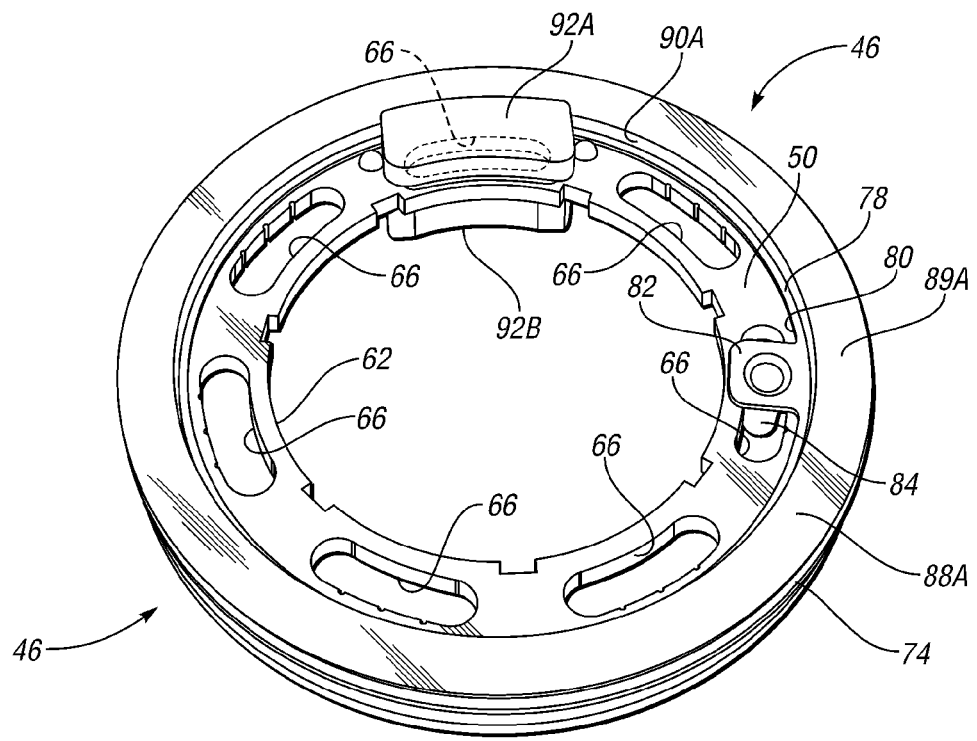
FIG. 4 is a schematic, perspective view of the resolver of FIG. 1 with a cover.
Figure 5:
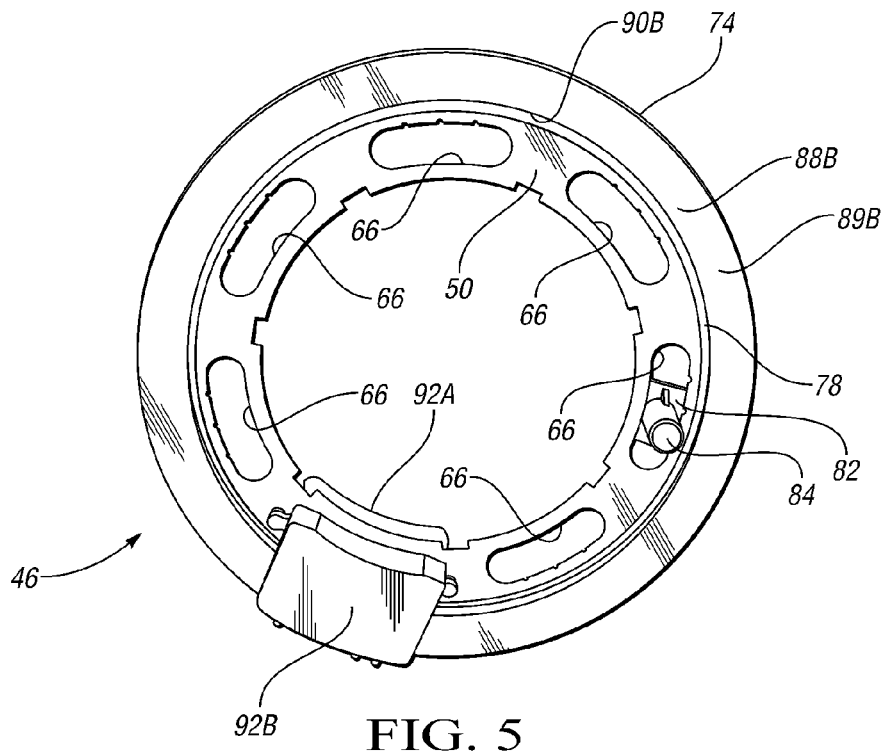
FIG. 5 is another schematic, perspective view of the resolver of FIG. 1 with the cover.

Referring to FIGS. 2, 4, and 5, a resolver cover 88 is mounted with respect to the stator core 50 to protect the coils 54. More specifically, the cover 88 is axially positioned relative to the coils 54 such that at least part of the cover 88 extends on the sides of the coils 54 opposite the winding support 78 to at least partially enclose the coils 54. The cover 88 in the embodiment depicted is comprised of two cover pieces 88A, 88B. Each of the pieces 88A, 88B is disposed on a respective axial side of the stator core 50 and coils 54. In an exemplary embodiment, the cover pieces 88A, 88B are heat staked to each other or to the stator core 50 to retain the cover 88 in position relative to the core 50. In an exemplary embodiment, the cover 88 comprises a polymeric material.

Each cover piece 88A, 88B includes a respective annular portion 89A, 89B. Each annular portion 89A, 89B defines a respective annular inner surface 90A, 90B. Each cover piece 88A, 88B includes a respective portion 92A, 92B that extends radially inwardly from a respective one of the annular inner surfaces 90A, 90B to cover one of the elongated apertures 66 containing electronic componentry (not shown). As understood by those skilled in the art, the stator core 50 comprises a plurality of laminations 94.

Figure 6:
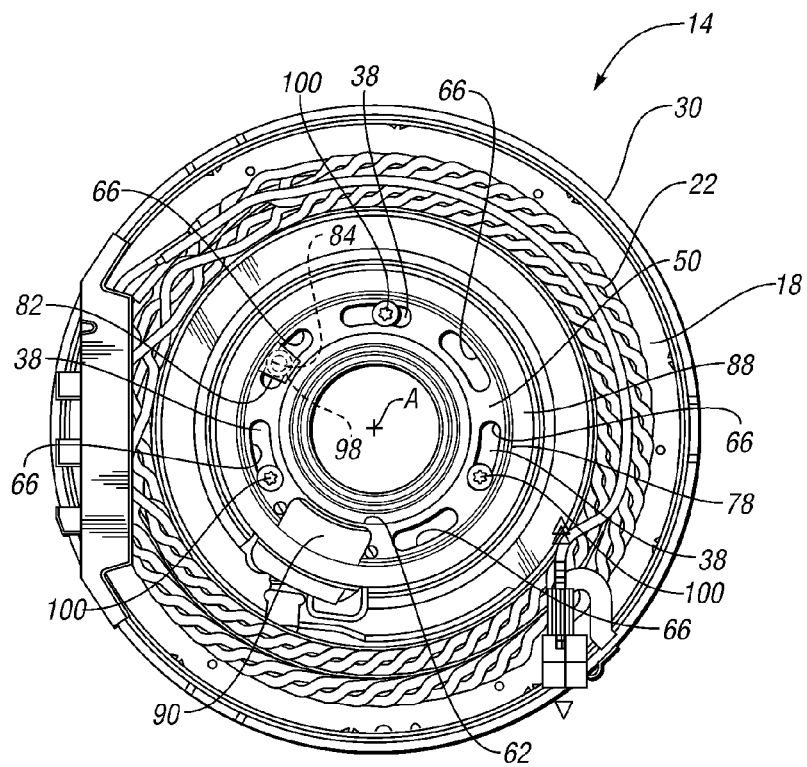
FIG. 6 is a schematic, sectional, side view of the motor assembly of FIG. 1.

Referring to FIG. 6, wherein like numbers refer to like components from FIGS. 1-5, the pin 84 extends into a hole 98 that is defined by the rotor support 38. The pin 84 thus functions as a locating feature, which ensures that the stator 46 is mounted with respect to the rotor support 38 and the motor stator 18 at the proper rotational position about axis A. Threaded fasteners such as bolts 100 extend through respective apertures 66 to engage with holes (not shown) formed in the rotor support 38 to rigidly mount the stator 46 to the rotor support 38.

Figure 7:
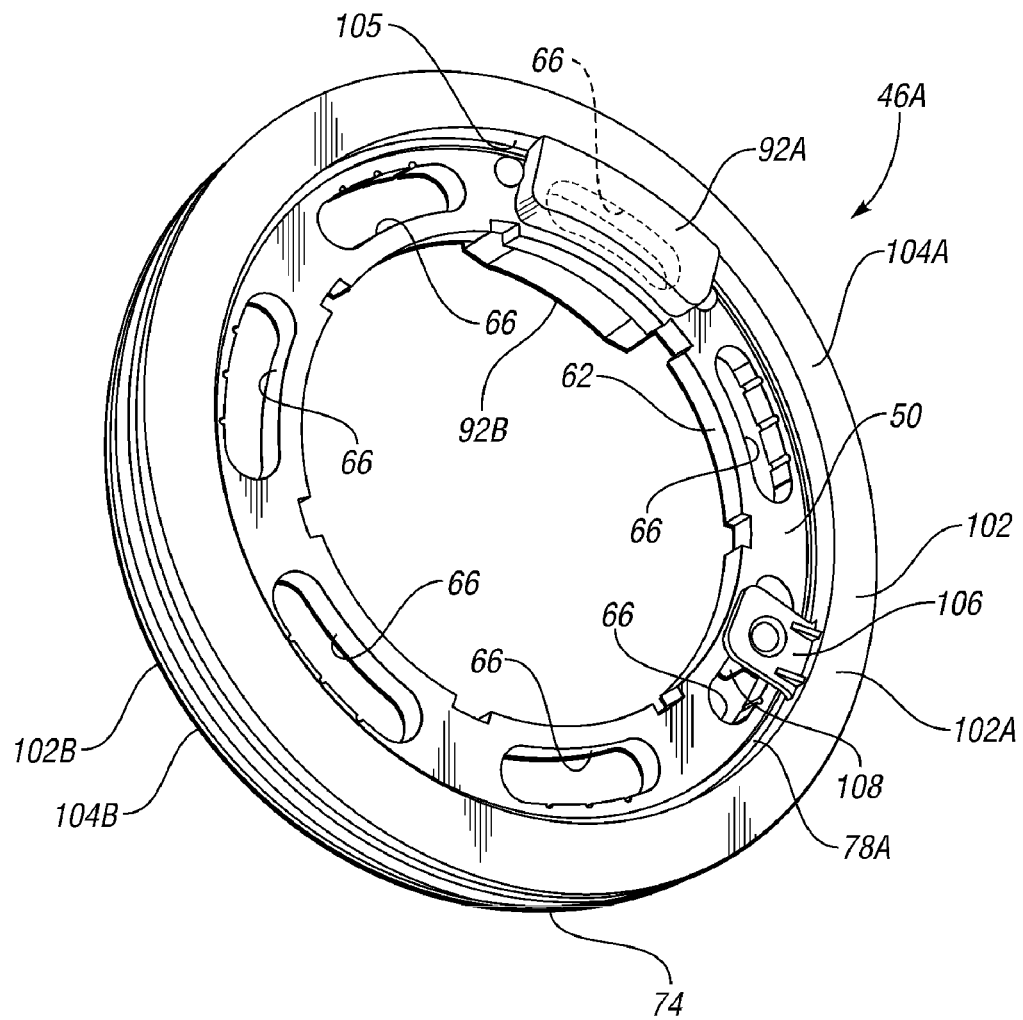
FIG. 7 is a schematic, perspective view of an alternative stator in accordance with the claimed invention.

Referring to FIG. 7, wherein like reference numbers refer to like components from FIGS. 1-6, an alternative stator 46A for use with the resolver 10 is schematically depicted. Stator 46A includes stator core 50 having annular inner surface 62, and defining apertures 66. Winding support 78A is substantially identical to winding support 78 (shown in FIGS. 2-6), except that winding support 78A does not include portion 82 and pin 84. Cover 102 is substantially similar to the cover shown at 88 in FIGS. 3-6. More specifically, cover 102 includes two pieces, namely 102A, 102B, each of which extends on a respective axial side of the coils (shown at 54 in FIG. 2). Each cover piece 102A, 102B includes a respective annular portion 104A, 104B having a respective portion 92A, 92B extending radially inward therefrom. More specifically, each annular portion 104A, 104B includes a respective annular inner surface (only one of which is shown at 105) from which portions 92A, 92B extend.

Cover 102 differs from cover 88 in that cover piece 102A includes a portion 106 that extends radially inward from annular portion 104A to extend across one of the apertures 66. Cover piece 102A also includes a pin 108 that projects axially from portion 106 to extend through the aperture 66 that portion 106 extends across. Pin 108 is fittable within the hole shown at 98, and thus functions as a locating feature in the same manner as pin 84. Cover piece 102A in the embodiment depicted is one-piece, i.e., the annular portion 104A, portion 106, and pin 108 are formed from a single piece of material.

While the best modes for carrying out the invention have been described in detail, those familiar with the art to which this invention relates will recognize various alternative designs and embodiments for practicing the invention within the scope of the appended claims.

The invention claimed is:

1. A resolver for determining the rotational position of a first member being selectively rotatable about an axis with respect to a second member that defines a hole, the resolver comprising:
   a stator core;
   a plurality of wire windings operatively connected to the stator core;
   a winding support between the windings and the stator core; and
   a cover at least partially enclosing the windings;
   wherein one of said cover and said winding support defines a pin that is fittable inside the hole of the second member.

2. The resolver of claim 1, wherein the stator core defines a plurality of apertures, and wherein the pin extends through one of the apertures.

3. The resolver of claim 2, wherein the apertures are arranged in a circle having a center on the axis.

4. The resolver of claim 3, wherein each of the apertures is an arc.

5. The resolver of claim 1, wherein the winding support defines the pin.

6. The resolver of claim 5, wherein the winding support is one-piece.

7. The resolver of claim 5, wherein the winding support defines an annular inner surface; wherein the winding support includes a radial portion that extends radially inward from the inner surface; and wherein the pin extends from the radial portion.

8. The resolver of claim 1, wherein the cover defines the pin.

9. The resolver of claim 8, wherein the cover includes an annular portion and a radial portion that extends inwardly from the annular portion; and wherein the pin extends from the radial portion.

10. A motor assembly comprising:
    a motor stator;
    a motor rotor that is selectively rotatable with respect to the motor stator about an axis;
    a member that is mounted with respect to the motor stator and that defines a hole; and
    a resolver stator having a stator core, a plurality of wire windings operatively connected to the stator core, a winding support between the windings and the stator core, and a cover at least partially enclosing the windings;
    wherein one of said cover and said winding support defines a pin that extends inside the hole of the member.

11. The motor assembly of claim 10, wherein the stator core defines a plurality of apertures, and wherein the pin extends through one of the apertures.

12. The resolver of claim 11, wherein the apertures are arranged in a circle having a center on the axis.

13. The resolver of claim 12, wherein each of the apertures is an arc.

14. The resolver of claim 10, wherein the winding support defines the pin.

15. The resolver of claim 14, wherein the winding support is one-piece.

16. The resolver of claim 14, wherein the winding support defines an annular inner surface; wherein the winding support includes a radial portion that extends radially inward from the inner surface; and wherein the pin extends from the portion.

17. The resolver of claim 10, wherein the cover defines the pin.

18. The resolver of claim 17, wherein the cover includes an annular portion and a radial portion that extends inwardly from the annular portion; and wherein the pin extends from the radial portion.

* * * * *